US010715591B2

(12) United States Patent
Park

(10) Patent No.: US 10,715,591 B2
(45) Date of Patent: Jul. 14, 2020

(54) METHOD FOR PEER-TO-PEER SYNCHRONIZATION USING VECTOR CLOCK AND SYSTEM USING THE SAME

(71) Applicant: pplink, Inc., Seoul (KR)

(72) Inventor: Ju Rung Park, Seoul (KR)

(73) Assignee: PPLINK, INC., Seoul (KR)

( * ) Notice: Subject to any disclaimer, the term of this patent is extended or adjusted under 35 U.S.C. 154(b) by 7 days.

(21) Appl. No.: 16/217,154

(22) Filed: Dec. 12, 2018

(65) Prior Publication Data

US 2020/0162547 A1 May 21, 2020

(30) Foreign Application Priority Data

Nov. 15, 2018 (KR) .......................... 10-2018-0140497

(51) Int. Cl.
*H04L 29/08* (2006.01)
*H04L 29/06* (2006.01)

(52) U.S. Cl.
CPC ...... *H04L 67/1048* (2013.01); *H04L 65/1093* (2013.01); *H04L 67/1095* (2013.01); *H04L 67/22* (2013.01); *H04L 67/32* (2013.01)

(58) Field of Classification Search
CPC ....... H04L 51/04; H04L 51/10; H04L 67/306; H04L 67/1048; H04L 67/1095; H04L 67/22; H04L 67/32; H04L 65/1093
See application file for complete search history.

(56) References Cited

U.S. PATENT DOCUMENTS

| | | | | |
|---|---|---|---|---|
| 2002/0194393 | A1* | 12/2002 | Hrischuk | G06F 9/542 719/318 |
| 2010/0070470 | A1* | 3/2010 | Milencovici | G06F 16/273 707/610 |
| 2014/0172944 | A1* | 6/2014 | Newton | H04L 67/06 709/202 |
| 2018/0349134 | A1* | 12/2018 | Studer | G06F 17/40 |

* cited by examiner

*Primary Examiner* — Arvin Eskandarnia
*Assistant Examiner* — Chhian (Amy) Ling
(74) *Attorney, Agent, or Firm* — Dinsmore & Shohl LLP; Yongsok Choi, Esq.

(57) ABSTRACT

Provided is a method of synchronizing a plurality of user terminals based on peer-to-peer (P2P) communication, the method including occurring a first state change in a first user terminal, generating first action information corresponding to the first state change in the first user terminal, transmitting the first action information from the first user terminal to a second user terminal, receiving the first action information in the second user terminal, adding the first action information to an application ready queue in the second user terminal, detecting whether a divergence or a causality violation occurs in the second user terminal, and applying a state change based on the first action information in the second user terminal.

10 Claims, 7 Drawing Sheets

METHOD FOR PEER-TO-PEER SYNCHRONIZATION USING VECTOR CLOCK AND SYSTEM USING THE SAME

CROSS-REFERENCE TO RELATED APPLICATION(S)

This application claims the priority benefit of Korean Patent Application No. 10-2018-0140479 filed on Nov. 15, 2018, in the Korean Intellectual Property Office, the disclosure of which is incorporated herein by reference for all purposes.

BACKGROUND

1. Field

One or more example embodiments relate to a method of implementing a real-time synchronization in a peer-to-peer (P2P) communication and a system using the method and, more particularly, to a method for stably securing a synchronization using a vector clock while performing a P2P communication between user terminals without using a relay server for synchronization and a system using the method.

2. Description of Related Art

With developments of the Internet and communication technologies, solutions and applications related to a video call, a video conference, an online conference, an electronic conference, a collaboration system, etc. involving a plurality of user terminals have been used in various ways. In addition, some solutions and applications provide a screen sharing function for sharing a screen in which contents such as messages and documents are displayed to users participating in related calls, conferences, and collaborative environments. In this instance, the solutions and applications enable more immediate and efficient communication by showing the same screen to the participating user terminals.

However, a typical real-time communication system includes a relay server or a state management server for synchronization, and a synchronization method using the server has disadvantages in terms of cost and latency. First, in the typical server synchronization method, since a server managing a current state between users should be always connected with the users, a server burden may increase as a number of concurrent users increases, which may also increase a server operation cost. Also, when a state of each of a plurality of users is changed, the server may reflect the change of the state and transmit a final state reflecting the change to each user. At this time, for example, it takes a time to process contents changed by a user A in the server until the contents is delivered to a user B, which may result in a relatively large delay time.

Accordingly, in terms of operating cost and latency, there is a desire for a system and a method for implementing stable synchronization through P2P communication between user terminals without using a relay server.

SUMMARY

An aspect is to provide a method and a system for solving a problem which has been solved through a relay management server for synchronization in real-time communication in a related art, based on serverless peer-to-peer (P2P) communication.

Another aspect is to implement decentralized synchronization which reduces a server load and a delay time through P2P communication between user terminals without a need of a state management server.

Still another aspect is to provide a synchronization method and system for providing a realistic experience to users in real-time communication and reducing a server maintenance cost by real-time synchronizing a state of a screen to be operated and changed during direct communication performed between user terminals.

Yet another aspect is to provide a synchronization method and system for solving a divergence or a causality violation that may occur in P2P communication, thereby stably ensuring synchronization.

The technical tasks obtainable from the present disclosure are non-limited by the above-mentioned technical tasks. And, other unmentioned technical tasks can be clearly understood from the following description by those having ordinary skill in the technical field to which the present disclosure pertains.

According to an aspect, there is provided a method of synchronizing a plurality of user terminals based on peer-to-peer (P2P) communication, the method including occurring a first state change in a first user terminal, generating first action information corresponding to the first state change in the first user terminal, transmitting the first action information from the first user terminal to a second user terminal, receiving the first action information in the second user terminal, adding the first action information to an application ready queue in the second user terminal, detecting whether a divergence or a causality violation occurs in the second user terminal, and applying a state change based on the first action information in the second user terminal.

The method may further include allocating a version to the first action information in the first user terminal and the detecting of whether a divergence or a causality violation occurs in the second user terminal may include comparing a version of a current state of the second user terminal and a version of the received first action information.

In a case in which a version value of the current state of the second user terminal is greater than a version value of the received first action information and a distance between the version value of the current state and the version value of the first action information is 1, a version of a state may be updated based on the first action information in the second user terminal.

The comparing of the version of the current state of the second user terminal and the version of the first action information may determine that the causality violation occurs in a case in which a version value of the current state of the second user terminal is greater than a version value of the received first action information and a distance between the version value of the current state and the version value of the first action information is greater than 2. Here, when it is determined that the causality violation occurs, the second user terminal may queue the first action information in the application ready queue until the first action information is in an applicable state.

The comparing of the version of the current state of the second user terminal and the version of the first action information may determine that the divergence occurs in a case in which the version of the current state and the version of the first action information include at least two attribute values associated with each user terminal, one attribute value indicates that a version value of the current state is greater than a version value of the first action information, and another attribute value indicates that a version value of the current state is less than a version value of the first action information. Here, when it is determined that the divergence occurs, whether the first action information is neglected is determined based on a predetermined rule.

The method may further include storing the first action information in an applied queue when the state change is applied based on the first action information in the second user terminal.

According to another aspect, there is also provided a system for synchronizing a plurality of user terminal based on P2P communication, the system including a first user terminal comprising a first communicator and a first processor and a second user terminal comprising a second communicator and a second processor, wherein the first user terminal is configured to generate first action information corresponding to a first state change and transmit the generated first action information to the second user terminal and the second user terminal is configured to receive the first action information, add the first action information to an application ready queue, detect whether a divergence or a causality violation occurs, and apply a state change based on the first action information.

The first user terminal may be configured to allocate a version to the first action information, and the second user terminal is configured to compare a version of a current state of the second user terminal and a version of the received first action information when detecting whether a divergence or a causality violation occurs.

In a case in which a version value of the current state of the second user terminal is greater than a version value of the received first action information and a distance between the version value of the current state and the version value of the first action information is 1, a version of a state may be updated based on the first action information in the second user terminal.

When comparing the version of the current state of the second user terminal and the version of the first action information, it may be determined that the causality violation occurs in a case in which a version value of the current state of the second user terminal is greater than a version value of the received first action information and a distance between the version value of the current state and the version value of the first action information is greater than 2. Here, when it is determined that the causality violation occurs, the second user terminal may queue the first action information in the application ready queue until the first action information is in an applicable state.

When comparing the version of the current state of the second user terminal and the version of the received first action information, it may be determined that the divergence occurs in a case in which the version of the current state and the version of the first action information include at least two attribute values associated with each user terminal, one attribute value indicates that a version value of the current state is greater than a version value of the first action information, and another attribute value indicates that a version value of the current state is less than a version value of the first action information. Here, when it is determined that the divergence occurs, whether the first action information is neglected may be determined based on a predetermined rule.

The second user terminal may be configured to store the first action information in an applied queue when the state change is applied based on the first action information in the second user terminal.

According to example embodiments, it is possible to provide a method and a system for solving a problem which has been solved through a relay management server for synchronization in real-time communication in a related art, based on serverless peer-to-peer (P2P) communication.

According to example embodiments, it is possible to implement decentralized synchronization which reduces a server load and a delay time through P2P communication between user terminals without a need of a state management server.

According to example embodiments, it is possible to provide a realistic experience to users in real-time communication and reduce a server maintenance cost by real-time synchronizing a state of a screen to be operated and changed during direct communication performed between user terminals.

According to example embodiments, it is possible to solve a divergence or a causality violation that may occur in P2P communication, thereby stably ensuring synchronization.

According to example embodiments, it is possible to provide a more comfortable environment without increasing the cost since server resources are not increased even when a number of concurrent users is increases.

Additional aspects of example embodiments will be set forth in part in the description which follows and, in part, will be apparent from the description, or may be learned by practice of the disclosure.

DETAILED DESCRIPTION

Hereinafter, example embodiments will be described in detail with reference to the accompanying drawings. It should be understood, however, that there is no intent to limit this disclosure to the particular example embodiments disclosed. On the contrary, example embodiments are to cover all modifications, equivalents, and alternatives falling within the scope of the example embodiments.

The terminology used herein is for the purpose of describing particular example embodiments only and is not intended to be limiting. As used herein, the singular forms "a," "an," and "the," are intended to include the plural forms as well, unless the context clearly indicates otherwise.

It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should be understood that, although the terms "first," "second," etc. may be used herein to describe various elements, these elements are not limited by these terms. These terms are only used to distinguish one element from another. Also, in the description of embodiments, detailed description of well-known related structures or functions will be omitted when it is deemed that such description will cause ambiguous interpretation of the present disclosure.

Further, constituent units included in example embodiments of the present disclosure are independently illustrated to describe different specific functions, and each of the constituent units may not indicate separate hardware or one software element. That is, the respective constituent units are arranged and included for convenience of description. Among the constituent units, two or more constituent units may be combined to serve as one constituent unit, and one constituent unit may be divided into a plurality of constituent units to perform a function. The integrated example embodiment of the constituent units and the divided example embodiments of each constituent unit are included in the claims as long as they do not depart from the spirit of the present disclosure.

Hereinafter, example embodiments will be described in detail with reference to the accompanying drawings. The configurations of the present disclosure and the resulting operational effects will be apparently appreciated through the detailed description described as below.

Figure 1:
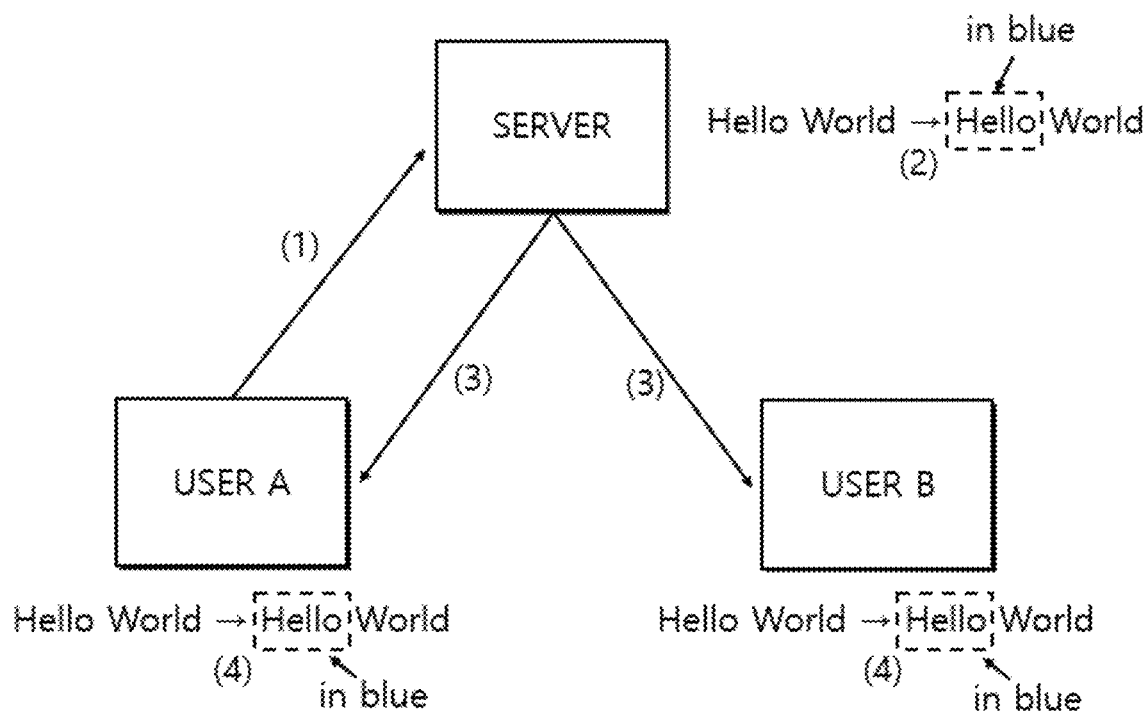
FIG. 1 is a diagram illustrating an example of a scheme of implementing synchronization using a server according to a related art.

FIG. 1 is a diagram illustrating an example of a scheme of implementing synchronization using a server according to a related art.

In the case of a typical service providing online sharing and collaboration functions, synchronization may be provided to a plurality of users through a relay server or a state management server. For example, when all the participants talk while viewing the same screen at the same time, typical services may manage information on the screen on a server. Specifically, information such as which character is in which position, what color the character is, and the like may be stored in the server and the participants may request the server to change a state.

Referring to FIG. 1, for example, (1) when a user A changes a first word "Hello" of a second sentence "Hello World" to blue, a change request may be sent to a server. (2) Then, the server may receive the change request from the user and correct state information included in the server. (3) The server may inform each of the user A and a user B of a correction result of the state information. (4) Then, the changed state may be displayed on screens of terminals of the users, so that the user A views the character changed to blue by the change request. When the synchronization is implemented using a relay server, it may be disadvantageous in terms of server burden cost and latency.

Figure 2:
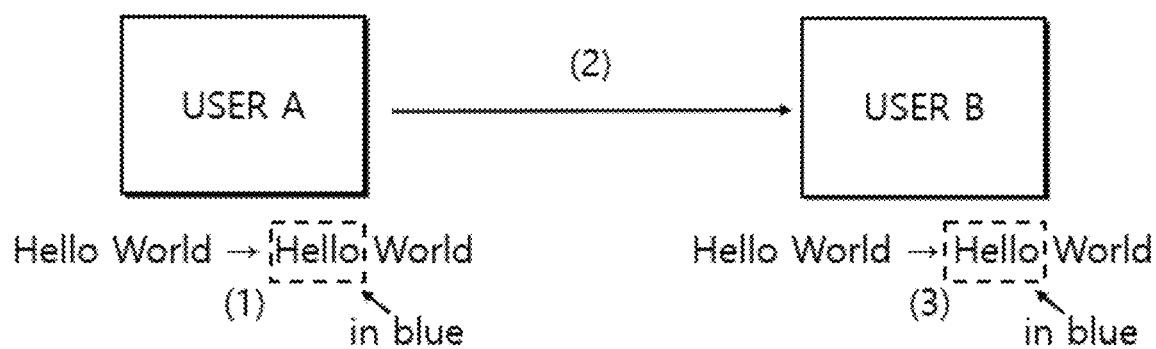
FIG. 2 is a diagram illustrating an example of a method of implementing a synchronization in response to a state change based on peer-to-peer (P2P) communication according to an example embodiment.

FIG. 2 is a diagram illustrating a method of implementing synchronization in response to a state change based on peer-to-peer (P2P) communication according to an example embodiment.

For synchronization of state changes, a state may be managed based on P2P communication without server relay as below. Referring to FIG. 2, (1) a state change that a first word "Hello" of "Hello World" displayed on a screen of a terminal of a user A is changed to blue may occur. (2) The terminal of the user A may inform a terminal of a user B of the state change occurring in the terminal of the user A through the P2P communication. (3) The terminal of the user B may receive information associated with the state change, accept the information, and change a state so that a first word "Hello" of a sentence "Hello World" is changed to blue.

However, such management of the state change based on the P2P communication may cause a divergence or a causality violation, which will be described in detail later.

Figure 3:
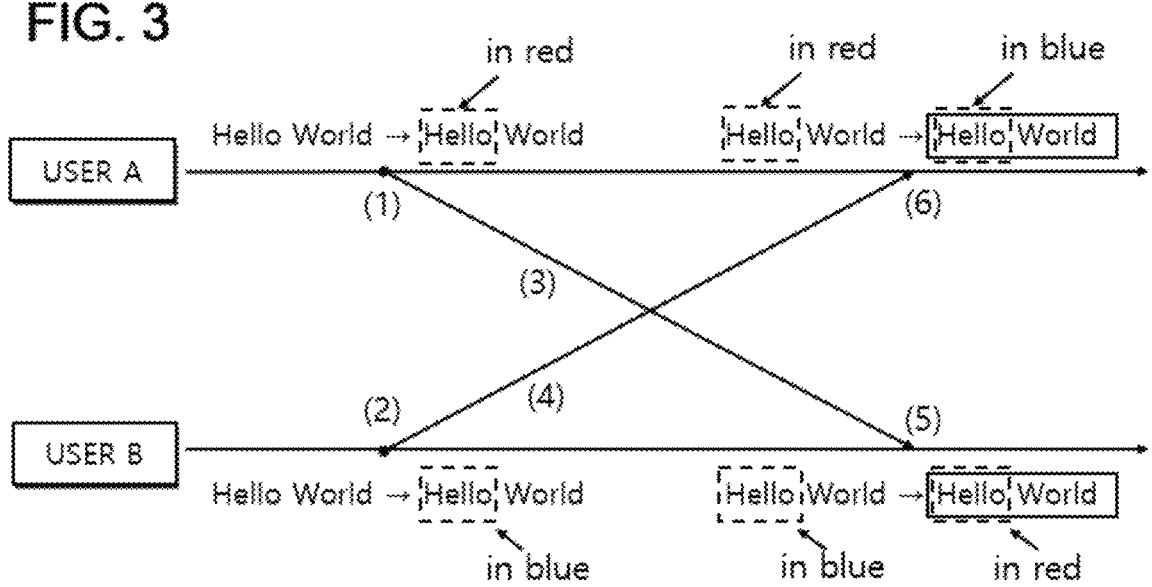
FIG. 3 is a diagram illustrating an example of a divergence occurring so that users have different states in response to concurrent operations of the users.

FIG. 3 is a diagram illustrating an example of a divergence occurring so that users have different states in response to concurrent operations of the users.

When at least two user terminals participate in communication, state changes simultaneously occur according to the concurrent operations, and an attribute of the same object is changed to be different values, a divergence, that is, state discrepancies, staggered or twisted states may occur.

Referring to the example of FIG. 3, (1) in a terminal of a user A, a state change that a first word "Hello" of "Hello World" displayed on a screen of the terminal is changed to red may occur. (2) Simultaneously or almost simultaneously, in a terminal of a user B, a state change that a first word "Hello" of "Hello World" displayed on a screen of the terminal is changed to blue may occur. In this case, (3) information associated with the state change that "Hello" is changed to red may be transferred to the terminal of the user A to the terminal of the user B. Simultaneously, (4) information associated with the state change that "Hello" is changed to blue may be transferred to the terminal of the user B to the terminal of the user A. Accordingly, (5) the terminal of the user B may change "Hello" to red based on the information received from the terminal of the user A. Also, (6) the terminal of the user A may change "Hello" to blue based on the information received from the terminal of the user B. Through this, a divergence may occur so that the terminal of the user A and the terminal of the user B have different states.

Figure 4:
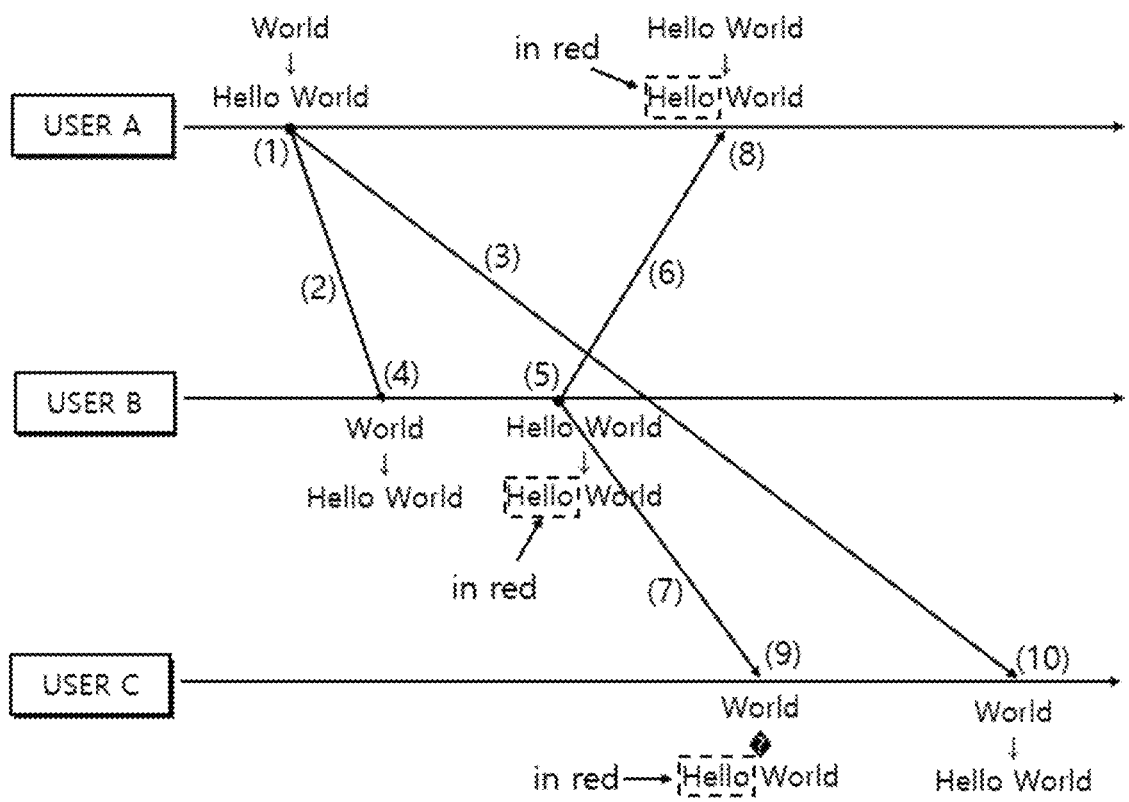
FIG. 4 is a diagram illustrating an example of a causality violation occurring due to a difference in network communication speed when at least three users are present.

FIG. 4 is a diagram illustrating an example of a causality violation occurring due to a difference in network communication speed when at least three users are present.

Referring to the example of FIG. 4, it is assumed that a number of users participating is three or more as a user A, a user B, and a user C, and a network communication speed between a terminal of the user A and a terminal of the user C is less than a network communication speed between the terminal of the user A and a terminal of the user B. As such, when at least three user terminals participate in P2P communication, a difference in communication speed between users may occur based on a network environment.

In an example, (1) the terminal of the user A may add "Hello" to "World" displayed on a screen of the terminal. (2) Information <add "Hello"> associated with a state change in the terminal of the user A may be transferred to the terminal of the user B through the P2P communication. (3) Also, the same information may be transferred to the terminal of the user C through the P2P communication. In this example, the information <add "Hello"> associated with the state change in the terminal of the user A may be transferred to the terminal of the user B in a short period of time but may be transferred to the terminal of the user C later due to a difference in communication environment.

Accordingly, (4) the terminal of the user B may apply the state change by adding "Hello" to "World" based on <add "Hello"> received from the terminal of the user A. (5) The terminal of the user B may change "Hello" to red. In this case, (6) information <change "Hello" to red> associated with a state change in the terminal of the user B may be transmitted to the terminal of the user A. (7) Also, the same information may be transmitted to the terminal of the user C.

(8) The terminal of the user A may accept the information <change "Hello" to red> received from the terminal of the user B and change "Hello" to red. (9) Meanwhile, the terminal of the user C may fail to change "Hello" to red based on the information <change "Hello" to red> received from the terminal of the user B. The reason is that "Hello" has not been added since the terminal of the user C does not receive <add "Hello"> from the terminal of the user A. (10) Thereafter, the terminal of the user C may receive <add "Hello"> from the terminal of the user A and add "Hello" to "World" displayed on a screen of the terminal.

As such, when network speeds of user terminals are different in a P2P environment, an order in which a state change request is generated may not match an order in which state change information is received so that a state change order is not sequential.

Figure 5:
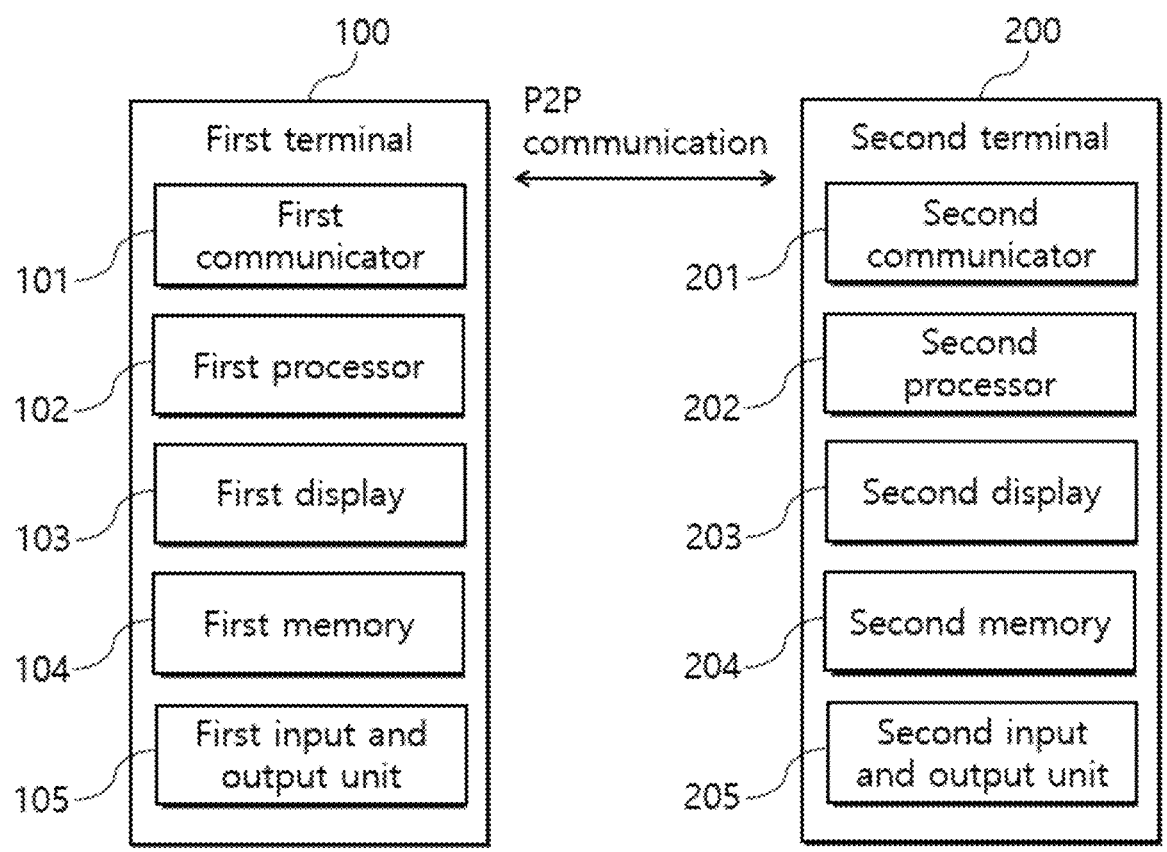
FIG. 5 is a diagram illustrating a configuration of a P2P synchronization system according to an example embodiment.

FIG. 5 is a configuration diagram illustrating a P2P synchronization system according to an example embodiment.

Referring to FIG. 5, although a first terminal 100 and a second terminal 200 capable of P2P communication are shown for the convenience of understanding, it is also possible that three of more terminals participate.

The first terminal 100 and the second terminal 200 may be devices capable of executing software programs or applications related to a video call, a video conference, an online conference, an electronic conference, a collaboration task, and the like. Also, the first terminal 100 and the second terminal 200 may be terminals capable of receiving and processing various data via wired or wireless communication based on an input and output operation of a user and displaying the corresponding data. The first terminal 100 and the second terminal 200 may be, for example, a smartphone, a tablet computer, a desktop computer, a laptop computer, a notebook, a workstation, a personal digital assistant (PDA), a portable computer, a wireless phone, a mobile phone, an e-book, a portable multimedia player (PMP), a portable game player, a digital camera, a television, a wearable device, and an artificial intelligence (AI) speaker but not be limited thereto.

A first communicator 101 and a second communicator 210 may perform at least one of wired communication and wireless communication through P2P communication between both terminals and be configured to support various communication networks such as a local area network (LAN), a metropolitan area network (MAN), and a wide area network (WAN). A communication method may include at least one of, for example, a long term evolution (LTE), a wideband code division multiple access (WCDMA), a code division multiple access (CDMA), global system for mobile communications (GSM), wireless fidelity (Wi-Fi), Bluetooth, and a near field communication (NFC) but not be limited thereto.

A first processor 102 and a second processor 202 may include a central processing unit (CPU), an application processor (AP), and the like. Also, the first processor 102 and the second processor 202 may include a memory to store data or instructions related to at least one other component, or communicate with an external memory. Each user terminal may use the first processor 102 and the second processor 202 to recognize and process a state change based on an operation or a change of a user, generate and update related action information and state information, and allocate a version of a form of a vector clock. Also, the first processor 102 and the second processor 202 may be used to compare a version of a current state and a version of action, thereby determining whether a divergence and a causality violation occur and performing an algorithm for solving the divergence and the causality violation. Related processing operation will be described in detail with reference to FIG. 6.

A first display 103 and a second display 203 may perform a function of displaying data and information to a user, and may include, for example, a liquid crystal display (LCD), a light emitting diode (LED) display, an organic LED (OLED) display, micro electro mechanical systems (MEMS) display and an electronic paper display but not be limited thereto. Also, the display may be combined with an input unit so as to be implemented as a touch screen.

A first memory 104 and a second memory 204 may perform a function of storing data and store, for example, changed state information values and transmitted and received action information values.

A first input and output unit 105 and a second input and output unit 205 may be components for receiving and outputting various user inputs in various ways. The first input and output unit 105 and the second input and output unit 205 may be configured to receive contents about a change and an operation performed by at least one user among a plurality of users based on contents provided on a shared screen, and receive a user input from at least one of, for example, a keyboard, a touch pad, a touch screen, a key pad, a dome switch, a physical button, a jog shuttle and a sensor, and a microphone.

Figure 6:
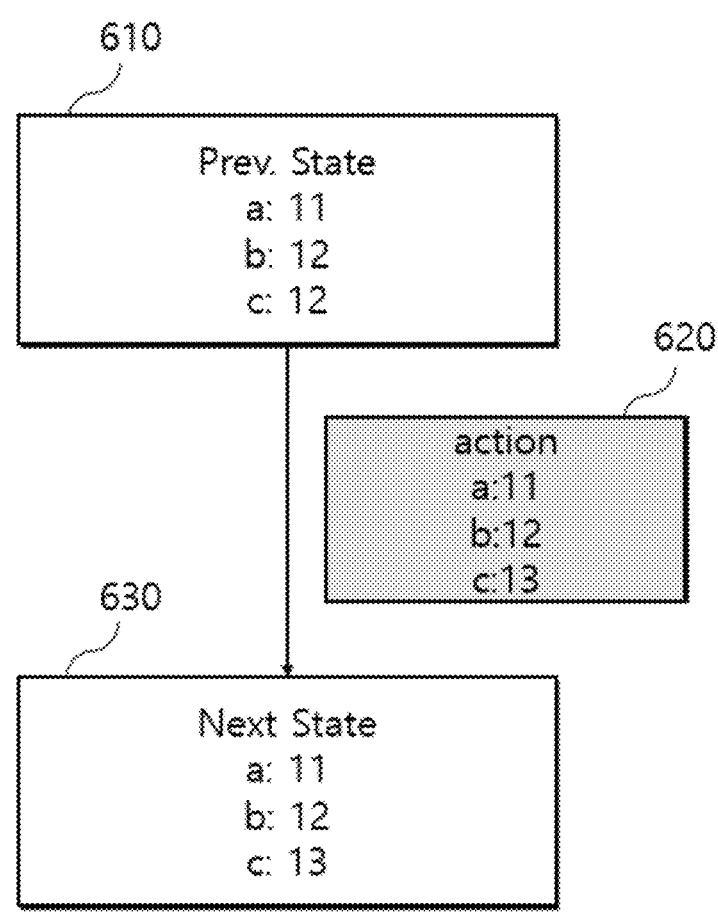
FIG. 6 is a diagram illustrating a configuration in which a version of a state is updated in response to action information being applied according to an example embodiment.

FIG. 6 is a diagram illustrating an example of a configuration in which a version of a state is updated in response to action information being applied according to an example embodiment.

According to an example embodiment, a minimum unit for performing a user operation or a state change in each user terminal may be defined as an action or action information. (1) The action information may include (1) an object to which an operation or a change is to be applied, (2) a method of the operation or the change, and (3) data associated with the operation or the change.

For example, in a case of an action of applying a change by adding a word "Hello" to the beginning of a sentence "World", (1) an object to which an operation or a change is to be applied may be the sentence "World", (2) a method of the operation or the change may be "adding word to the beginning of sentence", (3) data may be the word "Hello", and a sentence "Hello World" may be obtained after the action is applied.

An attribute of a version may be allocated and assigned to all action information for each time that the action information is generated, and the version may be set not to changed once the version is determined. Also, the action information may be expressed as a vector clock to have a plurality of attribute values related to each user terminal. A vector clock (VC) may be expressed as a set of digits or a version value corresponding to a terminal of an action generator that is a performer of a change or an operation related to each action. For example, when user terminals of three users are provided, a VC may be generated as {userA: 33, userB: 34, userC: 11}.

Also, a state in which action information is applied may include information associated with a state of each object. Like the action information, the state may have an attribute of a version and also be expressed as a vector clock. When action information is applied to a state vector clock of each object, a state change may be performed by updating a version of the corresponding state to be a version of an action.

Referring to FIG. 6, a vector clock may have an attribute value associated with each of the terminal of the user A, the terminal of the user B, and the terminal of the user C corresponding to an action generator. For example, a vector clock 610 of a previous state may have a version value of 11 with respect to a terminal (a) of the user A, a version value of 12 with respect to a terminal (b) of the user B, and a version value of 12 with respect to a terminal (c) of the user C. In this example, when action information 620 received from the terminal of the user C is {a:11, b:12, c:13}, the action information 620 may be applied to the vector clock 610 of the previous state and versions of all attribute values may be updated, so that a vector clock 630 of a subsequent state may be changed to be {a:11, b:12, c:13}.

As such, in order for the action information to be applied to the state to perform an update of the state, a vector clock representing a state version may be referred to as VCa and a vector clock representing a version of action information may be referred to VCs. In this example, the following two conditions may need to be satisfied.
1. VCa>VCs,
2. Distance between VCa and VCs, that is, d(VCa, VCs) =1

Here, a definition of a relationship between the versions of the vector clocks may be as follows.
A. VC1 is Greater than VC2.
  Definition: expressed as VC1>VC2 if VC1[i]>=VC2[i] with respect to all attribute values i of VC1 and VC2
  Example: VC1={a:4, b:3, c:3}, VC2={a:3, b:3: c:2}=>VC1>VC2
  VC1={a:1, b:1}, VC2={b:1}=>VC1>VC2
  VC1={a:1, b:1}, VC2={ }=>VC1>VC2
B. VC1 and VC2 are in a Divergence.
  Definition: expressed as VC1~VC2 when a and b different from each other and satisfying VC1[a]>VC2[a] && VC1[b]<VC2[b] or VC1[b]>VC2[b] && VC1[a]<VC2[a] is included in all the attribute values i of VC1 and VC2
  Example: VC1={a:1}, VC2={b:1}=>VC1~VC2
  VC1={a:1, b:2, c:3}, VC2={a:2, b:1, c:4}=>VC1~VC2
C. Distance Between VCs
  Definition: Sum of absolute values of difference in all attribute values
  Example: a distance between VC1 and VC2, that is, d(VC1, VC2) is 2 (=1+0+1) if VC1={a: 5, b: 5, c: 5} and VC2={a: 6, b: 5, c: 4}

Also, according to an example embodiment, a data structure of an action queue may be used for action information application. The action queue may include two types of queues, for example, an application ready queue in which an application is ready and an applied queue in which the application is completed.

The received action information may be on standby in the application ready queue before the action information is applied to a state. When the two conditions for being applicable to the state are satisfied, the action information may be applied to the state to change the state and moved to the applied queue. The action queue may be stored in a memory in a user terminal.

Next, a method of detecting and solving a divergence based on the definition of the relationship between versions of vector clocks will be described. In terms of an occurrence determination requirement, it is determined that the divergence occurs when a state vector clock version and an action information vector clock version are in a divergence state, for example, VCs~VCa as shown in the above equation. To solve this, actions changing the same attribute may be found among all actions in the divergence while searching the applied queue. Also, based on a predetermined rule, for example, a predetermined priority, corresponding action information may be neglected or overwritten. For example, when a priority level of the state change of the terminal of the user A is higher than a priority level of the state change of the terminal of the user B, an action related to the state change of the terminal of the user A may be applied and an action related to the state change of the terminal of the user B may be neglected.

Next, a method of method of detecting and solving a causality violation based on the definition of the relationship between versions of vector clocks will be described. An occurrence determination requirement may be "VCs <VCa && d(VCs, VCa) >=2". For example, when a state vector clock version is greater than an action information vector clock version and a distance between the versions is greater than "2", it is determined that the causality violation occurs. To solve this, action information may be sequentially applied when the action information is applicable due to an application of subsequently received action information while waiting in the application ready queue until applicable action information is received.

Figure 7:
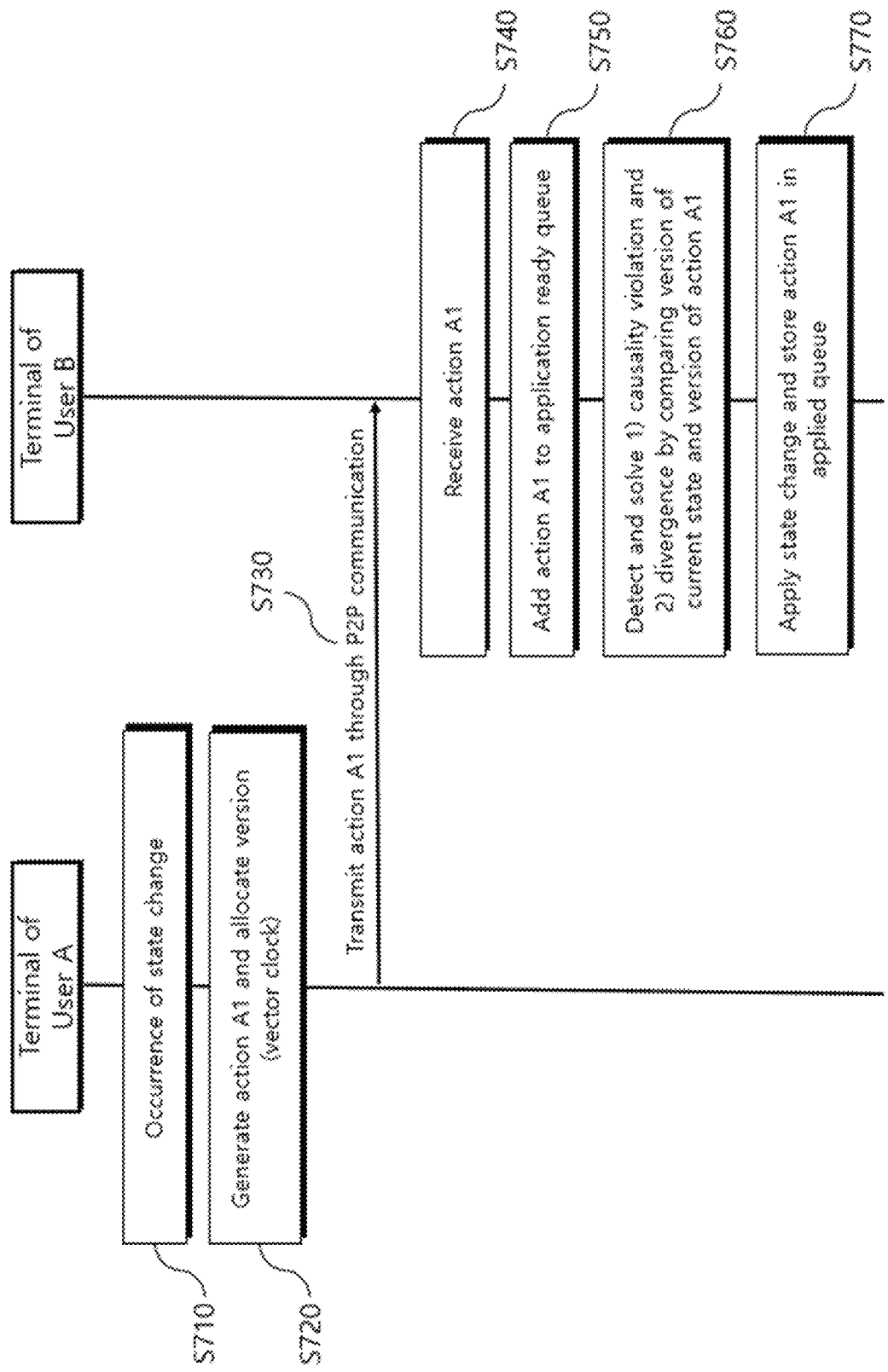
FIG. 7 is a flowchart illustrating a method of implementing real-time synchronization based on P2P communication according to an example embodiment.

FIG. 7 is a flowchart illustrating a method of implementing real-time synchronization based on P2P communication according to an example embodiment.

First, a state change may occur in a terminal of a user A in response to a change or an operation of the user A in operation S710. The terminal of the user A may recognize an occurrence of the state change, generate action A1 or action information A1 corresponding to the state change, and allocate a version in a form of a vector clock in the action A1 in operation S720. The terminal of the user A may transmit the action A1 to the terminal of the user B based on the P2P communication for real-time synchronization in operation S730.

The terminal of the user B may receive the action A1 transmitted from the terminal of the user A in operation S740. The terminal of the user B may add the received action A1 to an application ready queue in operation S750.

The terminal of the user B may compare a version of a current state and a version of the received action A1, thereby detecting whether a divergence or a causality violation and performing a solving operation in response to an occurrence in operation S760. Also, when the action A1 is applicable directly, the action A1 may be applied to the state so that the state is updated.

A determination whether the divergence or the causality violation occurs may be performed by comparing the version of the received action A1 and the version of the current state of the terminal of the user B. When a version value of the received action A1 is greater than a version value of the current state of the terminal of the user B and a distance between the version value of the state and the version value of the action A1 is "1", the action A1 may be applied to the state in the terminal of the user B, such that the version of the state is changed and updated.

Meanwhile, when comparing the version of the current state of the terminal of the user B and the version of the received action A1, it is determined that the causality violation occurs in a case in which the version value of the received action A1 is greater than the version value of the current state of the terminal of the user B and the distance between the version value of the state and the version value of the action A1 is greater than "2". As such, when it is determined that the causality violation occurs, the terminal of the user B may queue the action A1 in the application ready queue until the action A1 is in an applicable state and apply applicable actions among subsequently received action information, thereby solving the causality violation.

Also, when comparing the version of the current state of the terminal of the user B and the version of the received action A1, it is determined that the divergence occurs in a case in which the version of the current state and the version of the action A1 include at least two attribute values associated with each user terminal, one attribute value indicates that the version value of the current state is greater than the version value of the second action information, and another attribute value indicates that the version value of the current state is less than the version value of the action A1, that is, a state vector clock version and a vector clock version of the action A1 are in a state of divergence. As such, when it is determined that the divergence occurs, whether the action A1 is applied or neglected may be determined based on a predetermined criterion or rule, thereby solving the divergence.

When the action A1 is applied, the state change may be applied and the action A1 is stored in the applied queue in operation S770.

Figure 8:
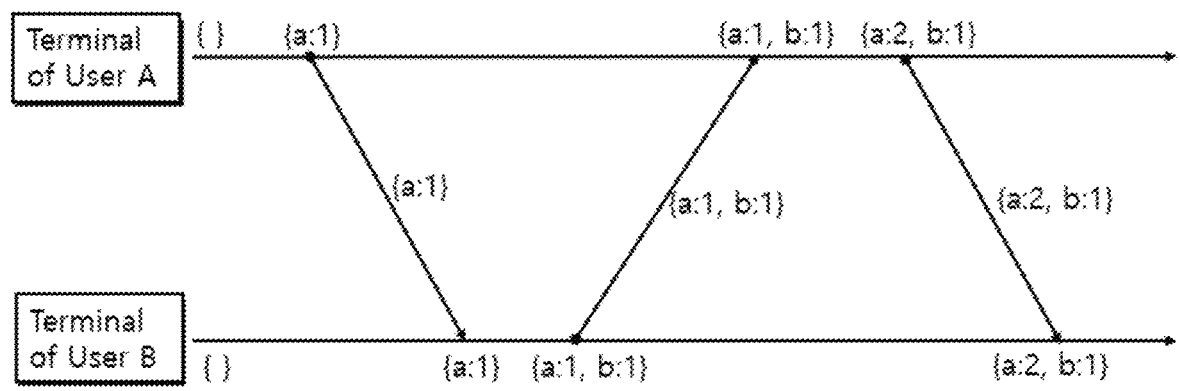
FIG. 8 is a diagram illustrating an example of a method of performing synchronization in response to a state change in P2P communication according to an example embodiment.

FIG. 8 is a diagram illustrating an example of a method of performing synchronization in response to a state change in P2P communication according to an example embodiment.

First, a state change may occur in the terminal of the user A, a state of the terminal of the user A may be changed from { } to {a:1}, and {a:1} generated as action information may be transmitted to the terminal of the user B. The terminal of the user B may apply the received action information {a:1} and change a state from { } to {a:1}. Thereafter, a state change may occur in the terminal of the user B. In this instance, the terminal of the user B may change the state to {a:1, b:1} and transmit {a:1, b:1} generated as action information to the terminal of the user A. As above, the terminal of the user A may apply the received action information and change the state to {a:1, b:1}, thereby performing a synchronization. Thereafter, the terminal of the user A may change the state {a:2, b:1} through the state change and transmit {a:2, b:1} to the terminal of the user B as action information. As above, the terminal of the user B may apply the received action information {a:2, b:1} to the state and update the state to {a:2, b:1}.

As such, when applicable action information is received, each terminal may apply the action information to a state, thereby maintaining the synchronization through an update.

Figure 9:
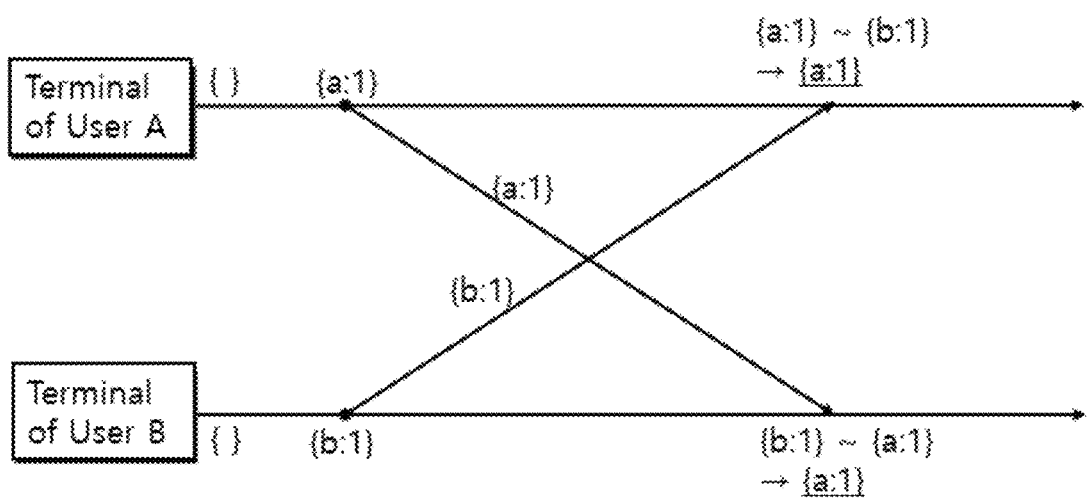
FIG. 9 is a diagram illustrating an example of a method of solving a divergence in P2P communication according to an example embodiment.

FIG. 9 is a diagram illustrating an example of a method of solving a divergence in a P2P communication according to an example embodiment.

Referring to FIG. 9, a state change may occur in a terminal of a user A, so that a state is changed from { } to {a:1}. Simultaneously, a state change may occur in a terminal of a user B, so that a state is changed from { } to {b:1}.

In this example, the terminal of the user A may transmit the generated action {a:1} to the terminal of the user B and the terminal of the user B may transmit the generated action {b:1} to the terminal of the user A. In the terminal of the user A, {a:1} which is a current state and {b:1} which is the received action may be in a divergence state, for example, {a:1} ~{b:1}. Thus, the terminal of the user A may determine that a divergence occurs. Also, in the terminal of the user B, {b:1} which is a current state and {a:1} which is the received action may be in a divergence state, for example, {b:1} ~{a:1}. Thus, the terminal of the user B may determine that a divergence occurs.

To solve this, according to a predetermined rule or priority, for example, when the state change of the terminal of the user A is prioritized relative to that of the terminal of the user B, {a:1} which is the action transmitted from the terminal of the user A may be applied and {b:1} which is the action transmitted from the terminal of the user B may be neglected. Through this, the synchronization may be implemented by matching the states to be {a:1} in the terminal of the user A and the terminal of the user B.

Figure 10:
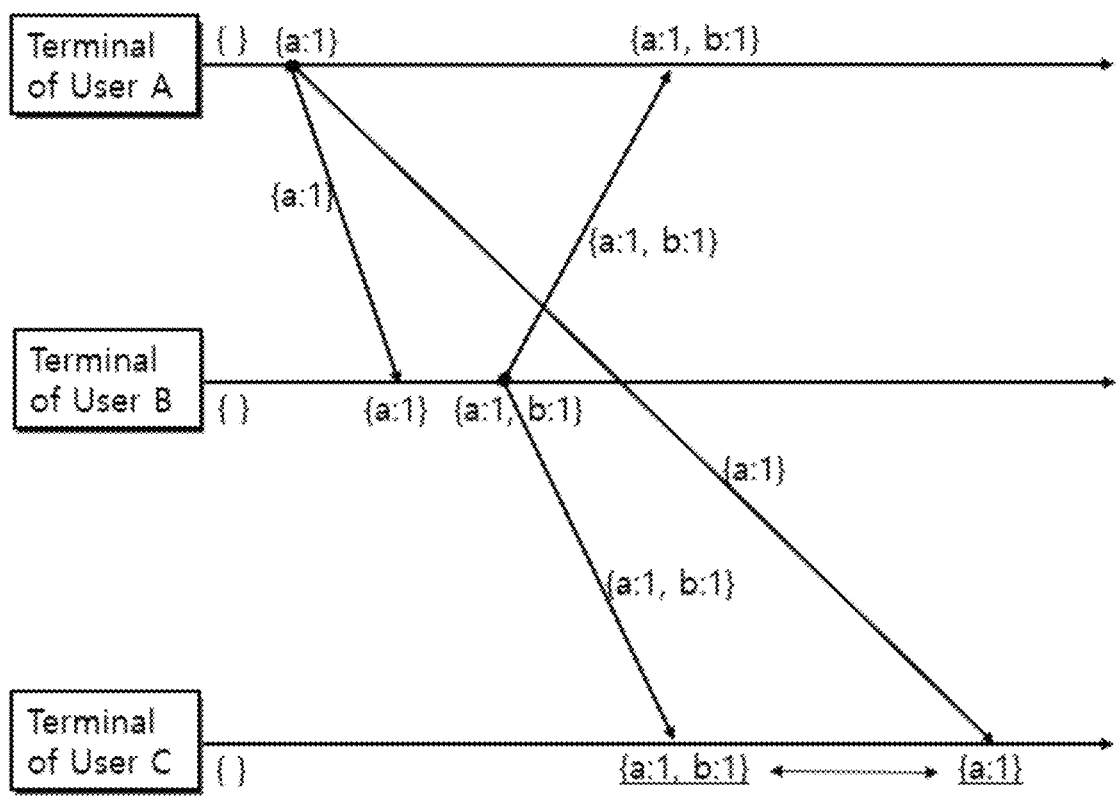
FIG. 10 is a diagram illustrating an example of a method for solving a causality violation in P2P communication according to an example embodiment.

FIG. 10 is a diagram illustrating an example of a method for solving a causality violation in P2P communication according to an example embodiment.

Referring to FIG. 10, a terminal of a user A may change a state from { } to {a:1} through a state change and transmit a generated action {a:1} to a terminal of a user B and a terminal of a user C.

The terminal of the user B may apply the action {a:1} received from the terminal of the user A and change a state from { } to {a:1}. Also, in response to a state change in the terminal of the user B, the terminal of the user B may change the state from {a:1} to {a:1, b:1} and transmit a generated action {a:1, b:1} to the terminal of the user A and the terminal of the user C.

Since the received action {a:1, b:1} is applicable, the terminal of the user A may change the state from {a:1} to {a:1, b:1}. However, in the case of the terminal of the user C, although the received action {a:1, b:1} is greater in size than a current state { } of the terminal of the user C, a distance between {a:1, b:1} and { } is 2 (=1+1) and thus, the terminal of the user C may determine that a causality violation occurs.

Accordingly, the terminal of the user C may queue {a:1, b:1}, which is inapplicable at present, in an application ready queue until {a:1, b:1} is in an applicable state. Also, the terminal of the user C may determine an applicability of {a:1} which is an action subsequently received from the terminal of the user A and apply {a:1} earlier than {a:1, b:1}. In response to the action {a:1} being applied earlier, the state of the terminal of the user C may be changed from { } to {a:1}. Also, the terminal of the user C may determine an applicability of the action {a:1, b:1} in a standby state and change the state from {a:1} to {a:1, b:1}, thereby changing a final state to be {a:1, b:1}. Through this, the causality violation may be solved and the synchronization of the terminal of the user A, the terminal of the user B, and the terminal of the user C may be implemented.

Although the synchronization method and system have been described in detail above through a number of example embodiments, the present disclosure is not limited thereto and should be construed as having the widest range according to the basic spirit disclosed herein. Those skilled in the art may implement a pattern of a form not stated above by combing or replacing the disclosed example embodiments, which should also be construed as within the scope of the present disclosure. Further, it will be apparent to those skilled in the art that various modifications and variation can be easily made to these example embodiments without departing from the spirit or scope of the claims.

What is claimed is:

1. A method of synchronizing a plurality of user terminals based on peer-to-peer (P2P) communication, the method comprising:
   occurring a first state change in a first user terminal;
   generating first action information corresponding to the first state change in the first user terminal;
   allocating a version value to the first action information in the first user terminal;
   transmitting the first action information from the first user terminal to a second user terminal;
   receiving the first action information in the second user terminal;
   adding the first action information to an application ready queue in the second user terminal;
   detecting whether a divergence or a causality violation occurs in the second user terminal; and
   applying a state change based on the first action information in the second user terminal,
   wherein the first action information is generated based on a minimum unit of a user change operation in the first user terminal;
   the detecting of whether a divergence or a causality violation occurs in the second user terminal comprises comparing a version of a current state of the second user terminal and a version of the received first action information;
   in a case in which a version value of the current state of the second user terminal is greater than the version value of the received first action information and a distance between the version value of the current state and the version value of the first action information is 1, a version of a state is updated based on the first action information in the second user terminal, and the distance is a sum of absolute values of difference in all attribute values of two version values;
   the comparing of the version of the current state of the second user terminal and the version of the first action information determines that the causality violation occurs in a case in which a version value of the current state of the second user terminal is greater than a version value of the received first action information and a distance between the version value of the current state and the version value of the first action information is greater than 2; and
   the comparing of the version of the current state of the second user terminal and the version of the first action information determines that the divergence occurs in a case in which the version of the current state and the version of the first action information include at least two attribute values associated with each user terminal, one attribute value indicates that a version value of the current state is greater than a version value of the first action information, and another attribute value indicates that a version value of the current state is less than a version value of the first action information.

2. The method of claim 1, wherein when it is determined that the causality violation occurs, the second user terminal queues the first action information in the application ready queue until the first action information is in an applicable state.

3. The method of claim 1, wherein when it is determined that the divergence occurs, whether the first action information is neglected is determined based on a predetermined rule.

4. The method of claim 1, further comprising:
   storing the first action information in an applied queue when the state change is applied based on the first action information in the second user terminal.

5. The method of claim 1, wherein the minimum unit of the user change operation is a change of a color of a word displayed on the first user terminal, or adding a word to a text displayed on the first user terminal.

6. A system for synchronizing a plurality of user terminal based on peer-to-peer (P2P) communication, the system comprising:
   a first user terminal comprising a first communicator and a first processor; and
   a second user terminal comprising a second communicator and a second processor,
   wherein the first user terminal is configured to generate first action information corresponding to a first state change and transmit the generated first action information to the second user terminal, and
   the second user terminal is configured to receive the first action information, add the first action information to an application ready queue, detect whether a divergence or a causality violation occurs, and apply a state change based on the first action information,
   wherein, the first action information is generated based on a minimum unit of a user change operation in the first user terminal,
   the first user terminal is configured to allocate a version value to the first action information, and the second user terminal is configured to compare a version of a current state of the second user terminal and a version of the received first action information when detecting whether a divergence or a causality violation occurs;
   in a case in which a version value of the current state of the second user terminal is greater than a version value of the received first action information and a distance between the version value of the current state and the version value of the first action information is 1, a version of a state is updated based on the first action information in the second user terminal, and the distance is a sum of absolute values of difference in all attribute values of two version values;
   when comparing the version of the current state of the second user terminal and the version of the first action information, it is determined that the causality violation occurs in a case in which a version value of the current state of the second user terminal is greater than a version value of the received first action information and a distance between the version value of the current state and the version value of the first action information is greater than 2; and
   when comparing the version of the current state of the second user terminal and the version of the received first action information, it is determined that the divergence occurs in a case in which the version of the current state and the version of the first action information include at least two attribute values associated with each user terminal, one attribute value indicates that a version value of the current state is greater than a version value of the first action information, and another attribute value indicates that a version value of the current state is less than a version value of the first action information.

7. The system of claim 6, wherein when it is determined that the causality violation occurs, the second user terminal queues the first action information in the application ready queue until the first action information is in an applicable state.

8. The system of claim 6, wherein when it is determined that the divergence occurs, whether the first action information is neglected is determined based on a predetermined rule.

9. The system of claim 6, wherein the second user terminal is configured to store the first action information in an applied queue when the state change is applied based on the first action information in the second user terminal.

10. The system of claim 6, wherein the minimum unit of the user change operation is a change of a color of a word displayed on the first user terminal, or adding a word to a text displayed on the first user terminal.

* * * * *